Nov. 18, 1969   L. G. KILMER   3,478,838
GAS EXPLODER SEISMIC SOURCE WITH CAVITATION EROSION PROTECTION
Filed Sept. 13, 1968
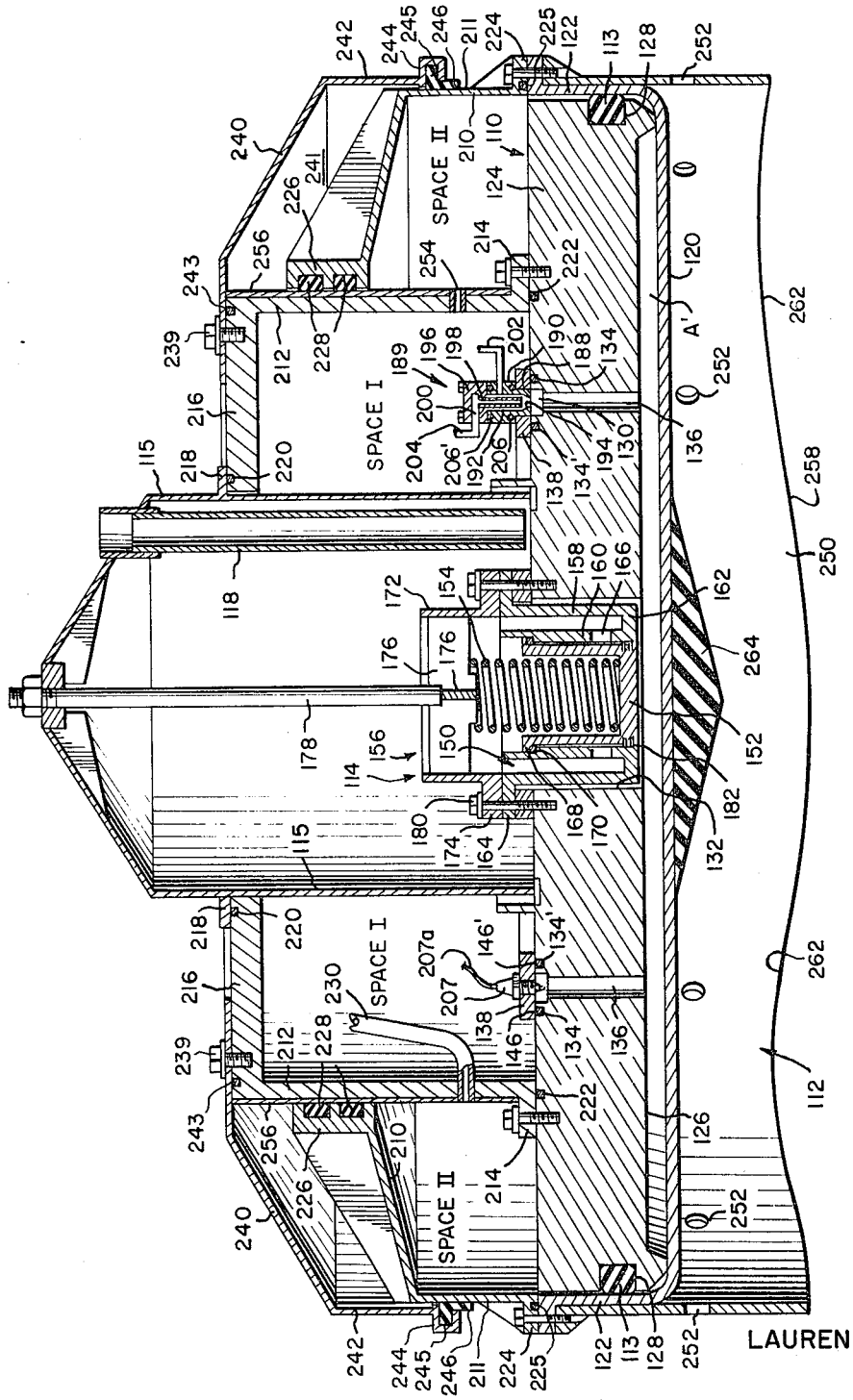
INVENTOR
LAUREN G. KILMER
BY McLean, Morton & Boustead
ATTORNEYS United States Patent Office 3,478,838
Patented Nov. 18, 1969

3,478,838
GAS EXPLODER SEISMIC SOURCE WITH
CAVITATION EROSION PROTECTION
Lauren G. Kilmer, Tulsa, Okla., assignor to Sinclair Oil
Corporation, a corporation of New York
Filed Sept. 13, 1968, Ser. No. 759,675
Int. Cl. G01v 1/00; G10k 11/00
U.S. Cl. 181—.5                                    17 Claims

ABSTRACT OF THE DISCLOSURE

A seismic prospecting device comprising a gas exploder adapted for underwater use including an expansible explosion chamber having a rigid top and a rigid bottom connected together by an extensible sidewall and resilient fastening means including air cushion spring means arranged above the chamber for attaching the top and bottom together and for normally biasing the top and bottom together, resilient sealing means inside of the joint formed between the top and bottom, gas charging and ignition means for the chamber, exhaust means for the chamber, bubble cap means including cap sealing means above the air cushion spring means to protect it against cavitation erosion, and cavitation erosion shield means on the underneath side of the rigid bottom.

---

This invention pertains to a seismic prospecting device. More particularly this invention pertains to a device for generating seismic prospecting impulses which is adapted for use underwater and which includes means for forming a sealed bubble cap above the device and means for forming a cavitation erosion prevention shield on the underneath side of its bottom plate.

As water-covered areas of the earth have been explored for oil bearing formations, efforts have been made to apply dry land techniques of seismic surveying, and although satisfactory results have been obtained, much has been left to be desired in reducing the cost of an operation which is highly expensive even under favorable conditions. For instance, it is known that a gas explosion confined in an expansible chamber acting at the earth-air interface against a large mass positioned above such gas explosion, can be used to impart a compression wave to the surface of the earth beneath the gas explosion, thereby initiating a seismic wave. If the explosion is confined in a device having a rigid top carrying the weight of the large mass and a rigid bottom with vertical extensible sidewalls, the seismic wave generated is useful for seismic prospecting by refraction and reflection techniques. The pulse imparted to the earth's surface by such a device has a high energy content and can be made of extremely short duration.

Although it has been attempted to use such devices in underwater geophysical exploration by supporting them on the bottom of barges or boats, this has generally been unsuccessful due to the large force of the seismic wave produced which adversely affects the boat structure. For these reasons, it has been the usual practice in underwater geophysical exploration to rely upon the well known techniques of generating seismic waves by exploding a quantity of explosive material such as dynamite or nitro carbonitrate, contained within a cartridge or casing and fired beneath the water in predetermined spaced relation with respect to the seismic spread. The use of explosive material, however, possesses several disadvantages, one of which, obviously, is the necessity for replacement of the explosive cartridge after each firing and the problems incident to establishing a firing circuit to each of the cartridges in successive order whenever another cartridge is to be fired. Such an arrangement is costly in operation particularly when a large number of shots are to be fired. Furthermore, when the explosive shot emanates from a point source as is the case with an explosive cartridge, the efficiency of the generated wave is low for the reason that the rate of change of pressure and the duration of the pressure peak do not correspond to the frequency most favorable to seismic wave propagation. It has been found necessary in the use of these prior devices to employ relatively large quantities of explosives to effect deep penetration of the seismic wave within the subaqueous geological formation by reason of the undesired frequencies and inefficient character of the wave thus produced.

The above problems are, however, overcome by a gas exploder seismic prospecting device such as described in copending United States patent application Ser. No. 613,792, filed Feb. 3, 1967, now Patent No. 3,401,771. The device there disclosed is especially designed for underwater geophysical prospecting although, if desired, it can also be used effectively for land prospecting as well. In general, the gas exploder of that application comprises a rigid top and a rigid bottom which, when at rest, are so constructed as to form between them a chamber in which a gas explosion can take place. The top and bottom are joined together by an extensible sidewall such that relative vertical separating movement can take place between them with the chamber remaining closed, to allow an increase in the volume of the chamber.

It is apparent that the lack of a solid platform for the bottom of the gas exploder to rest on when the device is used underwater can present some difficulty; however, this is overcome by attaching the bottom to the top with a resilient fastening or spring means having air cushions which limit the relative vertical separating movement between the top and bottom and bias the bottom toward the top, so that the volume of the chamber is generally maintained in its original size. Internally of the gas exploder a dynamic seal is provided positioned on the inner side or insde of and adjacent the clearances at the joint between the top and bottom of the gas exploder. Also, in order that the resilient fastening or spring means which biases the top and bottom of the exploder together be not overly strained, a valving arrangement is employed to release the force of the exploded gas simultaneously as relative movement between the top and bottom of the exploder occurs. This is also particularly desirable where several explosions are required at a given location.

The device of application Ser. No. 613,792 is quite useful in underwater geophysical prospecting; however, due to the forces applied in the chamber and the rate at which the top and bottom separate, that portion of the air spring cushion attached to the bottom which forms the top of the air cushion is frequently somewhat eroded or cavitated by the water against which it moves. This cavitation erosion appears to be due to the fact that movement of the air cushion top draws a vapor phase on this part. Also, a part of the energy which produces the seismic wave of interest is lost to the water.

Copending U.S. patent application Ser. No. 614,289 filed Feb. 6, 1967, now Patent No. 3,401,770 discloses a device which overcomes these cavitation erosion difficulties by providing an air filled bubble cap above the top of the air cushion. In that device the movable upper part of the air cushion top does not move against water, but against a compressible gas. It has been found, however, that during detonation water tends to enter the bubble cap by rising beneath the skirt thereof. This water, while not so great a problem as encountered with no bubble cap, does oppose movement of the top and accordingly consumes some of the explosion energy as well as causing cavitation. In addition, the bolts holding the bubble cap in place are strained by the force of the explosion acting through the water within the bubble cap. Lengthening the bubble cap skirt does not succeed in overcoming this problem.

In addition to cavitation erosion of the air cushion top, the exploder rigid bottom plate is liable to experience cavitation erosion and bowing due to the force of water acting on the bottom plate immediately following the explosion. It is theorized that water escapes from beneath the bottom plate faster at the edges thereof than at the middle, and so the middle can tend to bow upward with undesirable results. It has been found that addition of a skirt extending beneath the bottom plate from the periphery thereof prevents such bowing. It has further been found that, by providing the skirt with a wavy lower edge, cavitation erosion of the bottom plate is somewhat reduced. However, even with a wavy configuration on the lower edge of the bottom plate skirt, this cavitation erosion of the bottom plate remains a problem.

The present invention is a gas exploder suitable for use as a seismic signal generator, particularly adapted for use underwater, and including cavitation erosion prevention means. The gas exploder of this invention includes a rigid top and rigid bottom defining a closed detonation or explosion chamber. The top and bottom are joined together by an extensible sidewall to allow limited vertical movement between the top and the bottom, thereby increasing the volume of the explosion chamber. An air spring cushion, defined by a member attached to the bottom and extending over the top, biases the top and the bottom together. A bubble cap extends from the top over the air spring cushion. The lower edge of this bubble cap includes a seal to slidingly and sealingly engage the air spring cushion, thereby preventing water from entering the bubble cap. To reduce cavitation erosion of the rigid bottom plate, a cavitation preventation shield is attached to the lower outer surface of the bottom plate.

For a more complete understanding of the practical application of this invention, reference is made to the appended drawing which is a vertical section of one embodiment of a gas exploder constructed in accordance with this invention.

As illustrated, the exploder in accordance with this invention basically includes a top 110, a bottom 112, a sealing ring 113, a valve 114 and an exhaust stack 115. Top 110 includes an annular thick-steel plate 124 having an outside diameter slightly smaller than the inside diameter of the flange 122 on bottom 112 and is further provided with a depressed portion 126 in the bottom thereof as well as a groove 128 in the side thereof which contains sealing ring 113. The depressed portion 126 of plate 124 cooperates with bottom plate 120 of bottom 112 to form the chamber A' of the exploder. Plate 124 also has an annular groove 130 in its upper surface between its outer rim and a central opening 132. Two smaller annular grooves 134 and 134' can be arranged, if desired, in plate 124 on opposite sides of groove 130 for O-rings 146 and 146', respectively, which seal groove 130. Groove 130 is connected to the chamber A' by two small, vertical openings 136 disposed at approximately 180° relative to each other about central opening 132. Plate 124 carries a coaxially positioned, generally annular upper ring 138 which is attached to the top side of plate 124 and covers groove 130 to form therewith an annular passage.

Valve 114 includes a valve body 150, a piston or valve element 152, a helical spring 154 and a spring retainer cage 156. Generally valve body 150 includes a pair of coaxial cylindrical walls 158 and 160, which are spaced from each other, are closed together at their lower ends by means of an interconnecting annular end wall 162 and are open at their upper ends. The outer sidewall 158 at its upper end is provided with an outwardly extending annular flange 164 and itself has a diameter just less than that of opening 132 such that valve body 150 can be positioned in opening 132 with flange 164 overlying the top of plate 124. Inner wall 160 has a machined inside surface which is countersunk at its upper end and which is provided with a series of apertures 166 adjacent its lower end providing communication between the annular space between walls 158 and 160 and the central opening of valve body 150 lying inside wall 160. Piston 152 which is a machined casting sized to fit snugly but slidingly within cylindrical wall 160 has a flange 168 at its upper end received in the counter bore in the upper end of the interior of wall 160 to limit downward movement of piston 162 at a position in which the lower, closed end seals openings 166 in wall 160. An O-ring 170 cushions flange 168 at the counter bore surface. Piston rings 182 seal the piston 152 at its lower end.

Spring cage 156 includes a short steel cylinder 172 which has a pair of intersecting steel cross-plates 176 in its upper interior portion forming a spider to which is secured a cylindrical rod element 178. The cylinder portion 172 of spring cage 156 is positioned above valve body 150 with flange 174 overlying flange 164, and spring cage 156 and valve body 150 are retained in such spondingly disposed tapped bores arranged about opentures in flanges 164 and 174 which registers with correpondingly disposed tapped bores arranged about opening 132 in plate 124 such that helical spring 154 is retained snugly under compression between the underside of spider 176 and the upperside of the closed bottom of piston 152. The spacing of the flights of spring 154 in this position and the length of piston 152 in relation to the location of spider 176 is such that when piston 152 is displaced upwardly to the maximum compression of spring 154, apertures 166 in sidewall 160 are completely exposed to connect the chamber A' with the annular space between walls 158 and 160 of valve body 150 and hence with the exterior of the exploder through spring cage 156 and exhaust pipe 118. Pipe 118 can be connected through muffler 115 to provide low-pass characteristics desirably having an upper cut-off frequency on the order of five cycles per second.

The gas charging system basically includes a mixing valve 189 interconnected to groove 130. The mixing valve comprises a member 190 inserted into aperture 188 in ring 138. Member 190 has a central passage 192 with a tapered conical opening 194 which faces groove 130. A top valve member 196 carries a depending tube 198 which is inserted into passage 192 and opening 194 so that the spacing of the passage through opening 192 is controlled by the location of tube 198. A passage 200 extends through tube 198 and member 196. Separate connections 202 and 204, preferably valved, leading to storage cylinders (not shown) respectively for propylene, or other suitable fuel gas, and oxygen are connected, respectively, to passages 192 and 200. Two O-rings 206 and 206' seal member 190 to ring 138 and member 196, respectively. The ignition system includes spark plugs, such as spark plug 207, which are arranged in apertures in ring 138 on either side of the mixing valve 189 to extend through ring 138 and communicate with groove 130. Exteriorly the spark plugs thus mounted are electrically connected as depicted by line 207a to a suitable electrical supply (not shown). It is also apparent that other types of gas manifolds, ignition systems, and valves, can be used, if desired.

An air cushion formed between upwardly extending members 210 and 212 resiliently fastens bottom 112 to top 110. Member 212 is bolted to top member 124 at flange 214 and includes an upper flange 216 which engages flange 218 on muffler 115. Flange 216 is sealed at flange 218 by O-ring 220, and flange 214 is sealed at top member 124 by O-ring 222 to form between member 212 and muffler 115 an air space I. Member 210 is bolted at flange 224 to the flange 122 of bottom 112 and is sealed by O-ring 225. Member 210 extends upwardly and inwardly toward member 212 to slidably engage member 212. Member 210 engages member 212 at an enlarged portion 226 and is sealed thereat by O-rings 228 to form an air space II. Member 212 can be sheathed in a metal 256, e.g. Monel metal, for protection against sea water, if desired. Space II is normally filled with air under pressure, e.g. about 15 to 20 p.s.i.g. by means of a hose 230 which extends through the flange 216 (not shown). The air pressure space II bleeds through bleed valve 254 at a reduced rate from space II into space I which, accordingly, serves as a plenum chamber for the air filled spring. Space I is used to house the various hose connections 202 and 204 for the gas charging system, the mixing valve 189, the ignition spark plugs 207, hose 230, etc., and the pressure in space I serves to keep water out.

A bubble cap arrangement is attached by bolts 239 to flange 216 of member 212 and is sealed by O-ring 241. The bubble cap includes a member 240 extending outwardly over member 210. Member 240 has a downwardly extending skirt 242 which forms an air space 241 above member 210 in which member 210 can freely move. As mentioned above, if member 210 were allowed to move freely against the water above it, cavitation erosion of member 210 would occur. Also, a portion of the force of the explosion, which creates the seismic wave, would then dissipate into the water.

The lower periphery 244 of skirt 242 includes groove 245 in which resilient seal 246 is held. Seal 246, which is depicted by way of example as a long skirted, heavy walled wiper seal slidingly and sealingly engages sidewall 211 of member 210. An O-ring seal could be used in place of the wiper seal 246, if desired. Seal 246 is made of a tough resilient material such as polyurethane.

Skirt 250 is attached to bottom plate 120 at the outer rim thereof, e.g. through the use of the bolts connecting member 210 to flange 122. In the absence of skirt 250, an explosion in chamber A' could tend to bow bottom plate 120 upward in the middle thereof. It is theorized that, due to the absence of a support beneath the plate 120 in water and due to the incompressibility of water, the water escapes from beneath bottom plate 120 faster at the edges than at the middle, causing bowing of plate 120. Bowing of plate 120 can interfere with the operation of the device by closing passages 130 and/or valve 114. Air holes 252 can be provided in skirt 250 to allow air to escape upon submersion of the device. The bottom edge 258 of skirt 250 has a wavy configuration which assists in preventing cavitation errosion of the bottom plate 120. It has been found that cavitation erosion of bottom plate 120 is somewhat prevented if the lower edge of skirt 250 has a wavy configuration with a maximum length in the order of two inches and with a non-repetitive three-lobe configuration so that the ends of no diameter of the skirt are at the same distance from bottom plate 120. Preferably, the three lobe peaks, such as peak 260, are of the same height and are spaced between 80° and 160° apart, while the lobe valleys such as valleys 262 are preferably at different heights.

Cavitation erosion shield 264 is attached to the underside of rigid bottom plate 120. As depicted in the figure, shield 264 can be a cone-shaped mound of tough resilient material such as urethane which is cast onto the under surface of bottom plate 120 and then cured. Alternatively, shield 264 might be a hemisphere-shaped mound. The shield is machined to a smooth edge at the surface of plate 120 so that shield 264 adheres well to plate 120 with no edge which might be eroded. Shield 264 generally has a diameter in the order of six to ten inches, preferably six to eight inches. At its apex, shield 264 has a thickness in the order of one-half to two inches, but not greater than the maximum height of the lobes 260 of skirt 252. It has been found that a cavitation erosion shield such as shield 264 substantially prevents cavitation erosion of bottom plate 120.

In operation the gas exploder is located at a suitable location with bottom 112 resting beneath the surface of a body of water at a desired depth, e.g. up to 50 or more feet, with pipes connecting exhaust pipe 118 to the atmosphere above the surface of the water. Typically the force of spring 154 is sufficient such that operation of piston 152 does not occur until a pressure within exploder chamber A' on the order of 30 p.s.i.g. has been reached. Conduits 202 and 204 introduce a fuel such as propylene and an oxydizing gas such as oxygen until a pressure in exploder chamber A' on the order of 2 p.s.i.g. has been achieved. It will be apparent that a stoichiometric mixture of oxygen and propylene is preferred and that this can be achieved quite simply by introducing the gases such that the partial pressures of each are in proportion to the molar ratio of a stoichiometric mixture, i.e., $4.5:1::O_2C_3H_6$. The mixing valve insures adequate mixing of the gases. The pressure in space II is adjusted by introducing air through conduit 230 to provide a pressure sufficient to hold the bottom 112 and top 110 together and return them after an explosion. Due to the larger mass of top 110, upon explosion of the gases the initial force of the explosion is directed against bottom 112 to create the seismic wave of interest. The continued expansion of the exploding gases drives the bottom 112 downwardly relative to top 110, since bottom 112 is relatively considerably lighter than top 110. This movement tends to compress the air spring formed by space II. At this time the pressure of the exploding gases forces sealing ring 113 tightly against the joint formed between the flange 122 and top member 124, generally deforming ring 113 against such joint. At the same time as relative movement of the bottom 112 and top 110 occurs, piston 152 is lifted at an even faster rate to vent chamber A' througn valve 114 and muffler 115. This venting action is so rapid that normally the pressure is relieved within a fraction of a second, and, generally after such venting, the pressure of unvented combustion gases remaining between top 110 and bottom 112 is substantially negative relative to atmospheric, being on the order of about 5 p.s.i.a. As a result, it is usually unnecessary in subsequent firing to purge the interior of the gas exploder when recharging, and recharging can be so fast that repetitive firing at a significantly rapid rate is feasible. After an explosion, top 110 and bottom 112 are biased toward their closed position by the air pressure with space II as well as by the forces applied by the weight of top 110 and by hydrostatic pressure. The air pressure in space II also prevents bottom 112 from falling off the unit during use of the exploder underwater. Closure of valve 114 through the action of spring 154 is timed to provide for exhaust of chamber A'. Seal 246 prevents entrance of water into air space 241 beneath bubble cap member 240, thereby allowing air cushion member 210 to move vertically against air rather than water. In addition, since seal 246 substantially prevents water from entering air space 241, erosion of members 210 and 226 is prevented, and bolts 239 are not strained. Cavitation erosion shield 264, together with skirt 250, protects bottom plate 120 from erosion.

Although the present invention has been described with reference to preferred embodiments, numerous modifications and rearrangements could be made, and still the resulting apparatus would be within the scope of the invention.

What is claimed is:

1. Apparatus for propagating a seismic wave underwater including means defining a closed chamber having a rigid bottom and rigid top including at least a portion telescoping into said bottom and forming a joint between said top and bottom at their sides having clearances therebetween, a resilient sealing ring disposed between said top and bottom on the inner side of said joint positioned against the clearances thereof to seal said chamber, resilient fastening means normally biasing said top and bottom together for attaching said bottom to said top and permitting vertical movement between said bottom and said top including at least one air spring cushion for limiting said movement and formed by a member riding with said top and a member riding with said bottom during said vertical movement, cap means on said top forming an air space above said air spring cushion so that the uppermost of said members moves therewithin, resilient sealing means for slidingly sealing said air space to substantially prevent entrance of water into the air space, gas charging means including conduit means providing external communication to said chamber adapted to provide a combustible mixture in said chamber, ignition means for the combustible mixture, and exhaust means including means defining an opening in said top adapted to provide external communication from the atmosphere to said chamber, normally closed valve means positioned in said opening to close said communication therethrough and operable upon a predetermined increase in pressure in said chamber to open thereby communicating said chamber with the exterior of said device.

2. Apparatus as claimed in claim 1 in which said sealing means comprises a wiper seal.

3. Apparatus as claimed in claim 2 in which said wiper seal is polyurethane.

4. Apparatus as claimed in claim 1 further comprising:
   a skirt attached to said bottom and extending downwardly therefrom and having a bottom edge with a wavy non-repetitive multi-lobe configuration, the ends of no diameter of said bottom edge being at the same distance from said rigid bottom; and
   cavitation erosion shield means connected to the underneath side of said bottom substantially at the center thereof.

5. Apparatus as claimed in claim 4 in which the bottom edge includes three lobes spaced at intervals of from 80 degrees to 160 degrees around the skirt circumference, the lobe valleys being of substantially different heights and the lobe peaks being of substantially the same height.

6. Apparatus as claimed in claim 4 in which said shield means comprises a tough resilient mound fastened to said underneath side and meeting the surface of the underneath side with a smooth edge.

7. Apparatus for propagating a seismic wave underwater including means defining a closed chamber having a rigid bottom and rigid top including at least a portion telescoping into said bottom and forming a joint between said top and bottom at their sides having clearances therebetween, a resilient sealing ring disposed between said top and bottom on the inner side of said joint positioned against the clearances thereof to seal said chamber, resilient fastening means normally biasing said top and bottom together for attaching said bottom to said top and permitting vertical movement between said bottom and said top including at least one air spring cushion for limiting said movement and formed by a member riding with said top and a member riding with said bottom during said vertical movement, gas charging means including conduit means providing external communication to said chamber adapted to provide a combustible mixture in said chamber, ignition means for the combustible mixture, exhaust means including means defining an opening in said top adapted to provide external communication from the atmosphere to said chamber; normally closed valve means positioned in said opening to close said communication therethrough and operable upon a predetermined increase in pressure in said chamber to open thereby communicating said chamber with the exterior of said device, a skirt attached to said bottom and extending downwardly therefrom and having a bottom edge with a wavy non-repetitive multi-lobe configuration, the ends of no diameter of said bottom edge being at the same distance from said rigid bottom, and cavitation erosion shield means connected to the underneath side of said bottom substantially at the center thereof.

8. Apparatus as claimed in claim 7 in which the bottom edge includes three lobes spaced at intervals of from 80 degrees to 160 degrees around the skirt circumference, the lobe valleys being substantially of different heights and the lobe peaks being of substantially the same height.

9. Apparatus as claimed in claim 7 in which said shield means comprises a tough resilient mound fastened to said underneath side and meeting the surface of the underneath side with a smooth edge.

10. Apparatus as claimed in claim 9 in which said mound has a circular cross section with a maximum diameter of from six to ten inches and a maximum height of from one-half to two inches.

11. In a device for propagating a seismic wave underwater by the explosion of a combustible mixture in a chamber having a rigid bottom and a rigid top resiliently fastened together to permit limited vertical movement of said top relative to said bottom, the improvement of:
    a skirt attached to said bottom and extending downwardly therefrom and having a bottom edge with a wavy non-repetitive multi-lobe configuration, the ends of no diameter of said bottom edge being at the same distance from said rigid bottom; and
    cavitation erosion shield means connected to the underneath side of said bottom substantially at the center thereof.

12. Apparatus as claimed in claim 11 in which the bottom edge includes three lobes spaced at intervals of from 80 degrees to 160 degrees around the skirt circumference, the lobe valleys being of substantially different heights and the lobe peaks being of substantially the same height.

13. The improvement of claim 11 in which said shield comprises a tought resilient mound fastened to said underneath side and meeting the surface of the underneath side with a smooth edge.

14. The improvement of claim 13 in which said mound is cone-shaped.

15. The improvement of claim 13 in which said mound has a circular cross-section with a maximum diameter of from six to ten inches.

16. The improvement of claim 15 in which the maximum diameter is from six to eight inches.

17. The improvement of claim 15 in which said mound has a maximum height of from one-half to two inches.

References Cited

UNITED STATES PATENTS 3,401,770   9/1968   Kilmer et al.

RODNEY D. BENNETT, Jr., Primary Examiner

D. C. KAUFMAN, Assistant Examiner

U.S. Cl. X.R.

340—7

UNITED STATES PATENT OFFICE
CERTIFICATE OF CORRECTION

Patent No. 3,478,838                              Dated November 18, 1969

Inventor(s) Lauren G. Kilmer

It is certified that error appears in the above-identified patent and that said Letters Patent are hereby corrected as shown below:

Column 2, line 38, delete "insde" and insert therefor --inside--.

Column 3, line 35, delete "preventation" and insert therefor --prevention--.

Column 4, line 11, delete "162" and insert therefor --152--.

Column 4, line 21, immediately after "such" insert --position by a series of cap bolts 180 received in apertures in flanges 164 and 174 which register with corres- --.

Column 5, line 7, immediately after "pressure" insert --in--.

Column 5, line 47, delete "errosion" and insert therefor --erosion--.

Column 6, line 15, delete "$4.5:1::O_2C_3H_6$", and insert therefor --$4.5:1::O_2:C_3H_6$--.

Claim 13, line 2 thereof, delete "tought" and insert therefor --tough--.

SIGNED AND SEALED

SEP 29 1970

(SEAL)
Attest:

Edward M. Fletcher, Jr.
Attesting Officer

WILLIAM E. SCHUYLER, JR.
Commissioner of Patents

FORM PO-1050 (10-69)